June 29, 1965 T. J. WEIR 3,191,733
TORQUE TRANSMITTING FLUID COUPLING
Filed Jan. 7, 1963 4 Sheets-Sheet 1

INVENTOR.
THOMAS J. WEIR
BY
Lockwood, Woodard, Smith & Weikart
Attorneys

June 29, 1965    T. J. WEIR    3,191,733
TORQUE TRANSMITTING FLUID COUPLING
Filed Jan. 7, 1963    4 Sheets-Sheet 2

INVENTOR.
THOMAS J. WEIR
BY
Lockwood, Woodard, Smith & Weikart
Attorneys

INVENTOR.
THOMAS J. WEIR
BY
Lockwood, Woodard, Smith & Weikart
Attorneys June 29, 1965  T. J. WEIR  3,191,733
TORQUE TRANSMITTING FLUID COUPLING
Filed Jan. 7, 1963  4 Sheets-Sheet 4

INVENTOR.
THOMAS J. WEIR
BY
Lockwood, Woodard, Smith & Weikart
Attorneys

United States Patent Office 3,191,733
Patented June 29, 1965

3,191,733
TORQUE TRANSMITTING FLUID COUPLING
Thomas J. Weir, Indianapolis, Ind., assignor to Schwitzer Corporation, Indianapolis, Ind., a corporation of Indiana
Filed Jan. 7, 1963, Ser. No. 249,704
18 Claims. (Cl. 192—58)

This invention relates generally to fluid coupling devices, and more particularly to an arrangement for transferring coupling fluid from an active to an inactive status for varying the degree of coupling, the transfer of the coupling fluid being responsive to one or a combination of conditions such as external ambient temperature, internal coupling temperature, input speed to the coupling, etc.

Automotive vehicles, such as passenger automobiles and buses are now being provided with air conditioning equipment, the condensing element of such equipment being mounted in front of the cooling radiator of the engine. The air flowing through the condensing element is heated thereby and then flows through the cooling radiator of the engine, thereby influencing the cooling characteristics of the radiator. Accordingly, the size of the cooling fan and its speed of rotation have been increased to provide adequate volume of cooling air. As a result, the parasitic load on the engine has been increased and the noise of fan operation has risen to an objectionable level.

To compensate for these effects the cooling fan of the engine is provided with a fluid coupling device having temperature responsive means controlled either by the temperature of the air flowing through the radiator or by the temperature of the water circulating through the engine cooling system. Such temperature responsive means are, of course, mounted externally with relation to the coupling housing itself. The degree of coupling between the fan and the engine is controlled by the temperature responsive means to provide substantially direct coupling of the fan to the engine when the air or the cooling water is at relatively high temperatures and to effect a certain degree of slip within the coupling to drive the fan at lower than normal speeds when the temperature of the air or cooling water is relatively low. These temperature variable couplings have the advantage of decreasing the power supplied to the fan by the engine when less air is needed for cooling purposes.

Depending upon the type of response desired, the temperature responsive means may be located within the coupling housing and under such conditions the action and function of the temperature responsive means is substantially the same as that of the externally mounted temperature responsive means referred to above. This temperature responsive type of variable coupling, in addition to the advantages pointed out above, also results in a minimum of fan noise since the fan speed is reduced except when necessary to provide proper heat exchange.

In conventional devices of the type referred to above, for a given input speed to the coupling the fan speed or degree of coupling increases with increases in the temperature of the medium ambient to the element along a characteristic curve. For increased input speeds this characteristic curve attains a somewhat increased slope, but the variation in slope of the characteristic curve for increased input speeds is not pronounced. Under certain operating conditions it is highly desirable that, for increased input speeds, the rate of change of fan speed or degree of coupling decrease with increase in the air temperature ambient to the thermally responsive element of the coupling. While the opposition of the speed responsive means to the temperature responsive means is desirable in couplings designed for certain applications, it is also sometimes desirable to arrange the speed responsive means so that it reinforces the temperature responsive means with higher input speeds.

Heretofore, in couplings of the type referred to above, the conditions responsive control of the degree of coupling between the driving and driven elements thereof has been accomplished by providing a drive chamber and a storage chamber for the fluid providing the coupling between the active surfaces. An internal pump is utilized for providing a pressure differential between the storage chamber and the drive chamber and a valved aperture is further provided with the valve opening or closing in response to the magnitude of the condition utilized to control the coupling. In such arrangements the pump for transferring fluid between the chambers is operated continuously independently of the magnitude of the condition controlling the valved aperture providing communication between the chambers.

It is the principal object of the present invention to provide a fluid coupling for an automotive engine fan or the like in which fluid is transferred from an active to an inactive status with respect to the coupling in response to one or a combination of conditions such as the temperature exterior of the coupling, coupling interior temperature, coupling input speed, etc., this function being accomplished without the use of condition responsive valves, obstructed apertures or the like.

A further object of the present invention is to provide a coupling of the type referred to above in which the transfer of fluid is accomplished by operating a fluid pump in response to the magnitude of the pertinent condition or combination of conditions, the condition responsive operation of the pump itself, as distinguished from the condition responsive throttling of the intake or discharge lines or apertures of a continuously operating pump, serving to transfer the fluid and thereby eliminating the necessity for condition responsive valves or the like and eliminating the heat increment generated in valved couplings when the pump is continuously operated even under conditions when no fluid transfer can occur.

A further object of the present invention is to provide a structure of simple and reliable construction for achieving the foregoing objectives.

The structure of the present invention, in general, provides a fluid coupling element comprising a casing having a fluid reservoir or storage chamber therein and a drive chamber accommodating a drive disc, the casing or housing being adapted to support an engine cooling fan or to be coupled to any desired form of accessory device. A pump mechanism is provided which, when operated, induces fluid flow between the storage chamber and the drive chamber. The pump is operated in response to one or a combination of pertinent conditions such as temperature or speed to establish the amount of fluid in the drive chamber and, hence, the degree of coupling between the disc and the casing.

The above mentioned objects and others will become apparent as the description proceeds with reference to the accompanying drawings in which.

Referring initially to FIGS. 1, 2, 3, 3A, and 4, the invention is embodied in a fluid coupling assembly comprising a casing member 10 having a hub 11 for rotatably mounting the casing on a drive shaft 12, there being a bearing 14 and seals 14a for supporting the casing on the shaft. Shaft 12 may be integrally connected with a coupling flange 15 for coupling the drive shaft 12 to any conventional rotating part of an internal combustion engine. If the coupling unit is utilized for driving a cooling fan, the fan may be bolted to casing 10 by means of bolts threadedly engaging a plurality of radially disposed threaded bores 16 and the member 15 may be connected to the pulley which conventionally drives the engine water pump.

Casing 10 is provided with a cover member 18, the peripheral edges of which engage the peripheral edges of a divider plate 19 (FIG. 2) seated on an annular surface 20 formed adjacent the periphery of casing 10. Cover member 18 and plate 19 may be clamped to casing member 10 by means of an annular flange member 21 swaged or otherwise formed into pressure engagement with the outer peripheral surface of the cover 18. The outer face of cover member 18 is provided with heat dissipating ribs or projections 18a and the peripheral portion of casing 10 is also provided with heat dissipating vanes 10a. The cover 18 is formed and mounted to establish spaced relationship with respect to the divider plate 19 thus providing a fluid reservoir 23 between the cover 18 and plate 19.

Figures 1, 3A:
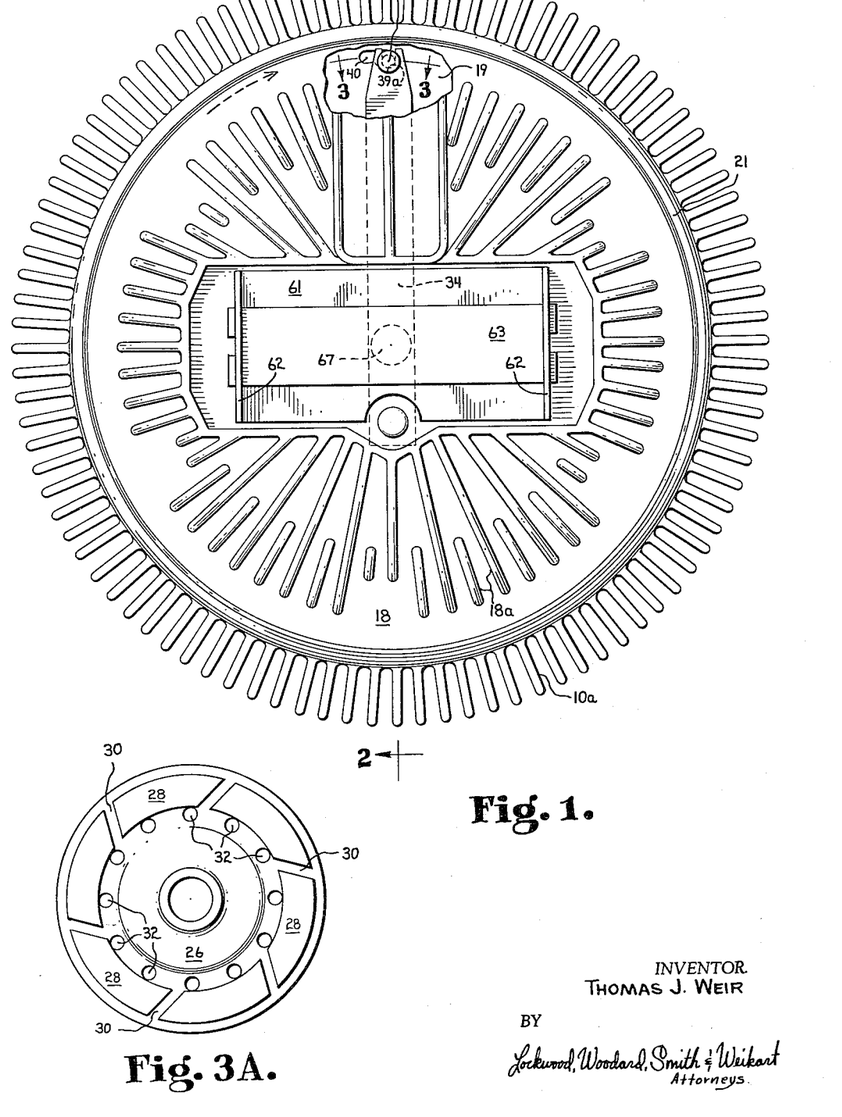
FIG. 1 is a front view of a fluid coupling embodying the present invention with a portion broken away to illustrate the internal construction.
FIG. 3A is a front elevation, in reduced scale of the drive disc taken from the left hand side of FIG. 2.

The casing 10 is formed to provide a recess inwardly of plate 19 to thereby define a drive chamber 24 within which is mounted the drive disc 26 press-fitted or otherwise fixed upon the shaft 12. The peripheral portions of the disc 26 are covered with arcuate facing members 28 and 51 which may be spaced from one another, as shown in FIG. 3A, to provide grooves or channels 30 extending between the outer portion of the facing members 28 and 51 inwardly across the entire width of the facing members. Located adjacent the inner margins of the facing members 28 are a series of uniformly distributed ports 32 which extend completely through the disc 26. The grooves 30, together with the ports 32, provide toroidal circulation of fluid about the peripheral portion of the plate 26 as is fully described and claimed in my United States Letters Patent No. 2,879,755 granted March 31, 1959.

A pump means for transferring fluid between the reservoir 23 and the drive chamber 24 comprises an abutment member 39. The abutment member 39 may for example be of cylindrical configuration and extends into, but is movable within an aperture 39a in the plate 19. It will be obvious that other configurations of member 39 may be utilized. As will be evident from FIG. 1, the aperture 39a includes a further aperture portion forming a port 40 which provides fluid communication between the reservoir 23 and the drive chamber 24. It will be noted that the abutment member 39 is positioned closely adjacent the port 40 but trails the port in the direction of rotation of the plate 19 with relation to the drive disc 26. While rotation of the casing, the plate 19 and the drive disc 26 is clockwise as viewed in FIG. 1 and as there indicated by an arrow in broken lines, since the plate 19 and the casing lag the drive disc in speed, the rotation of plate 19 and the casing relative to the drive disc 26 is counter-clockwise.

Means are provided for controlling the position of the abutment 39 and this includes a resilient element taking the form of the blade 34 rigidly attached by a rivet or other suitable means to the inner face of the cover 18. The free end of the blade 34 is notched and extends into a circumferential groove in the abutment 39 thereby providing a motion transmitting connection between the blade 34 and the abutment.

Mounted on the exterior face of the cover 18 is a generally U-shaped bracket 61 having outwardly extending portions 62 at each of its extremities. The central section of each of the outwardly turned portions 62 is cut away to accommodate the tips of a thermally responsive means in the form of a bimetal strip 63. The bimetal strip is arranged so that its high expansion side 64 faces outwardly away from the cover 18.

Figure 2:
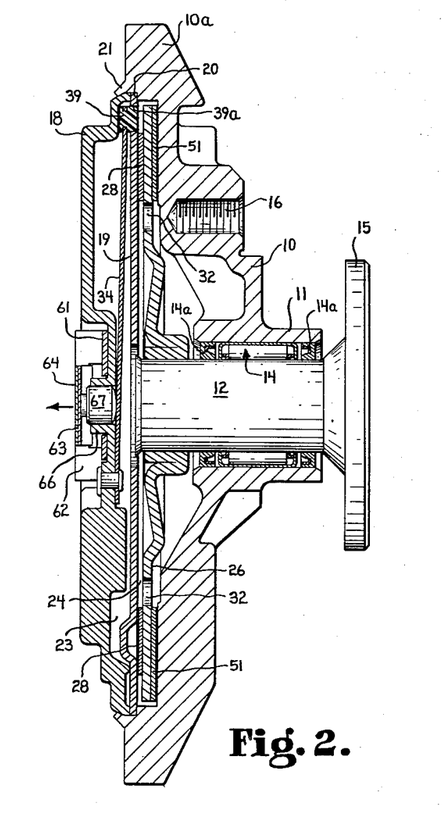
FIG. 2 is a side sectional view taken generally along the line 2—2 of FIG. 1.

When so arranged, it will be evident that upon an increase in temperature ambient to the bimetal strip, the central portion of the strip will bow outwardly as indicated by the arrow in FIG. 2. Beneath the center of the bimetal strip, the cover 18 is apertured and the area surrounding the aperture is flanged outwardly as indicated at 66. The outwardly flanged portion encircles a thrust member 67 which at one end bears against the inner face of the bimetal strip 63 and at its other end engages the blade 34. As will be evident from FIG. 2, the mounting of the blade 34 is such that its inherent resiliency urges it against the inner end of the thrust member 67.

In operation, the reservoir 23 is filled with a fluid such, for example, as an oil to a degree sufficient to fill the spaces in chamber 24 between the opposing surfaces of the facings 28 and 51 and the adjacent walls of plate 19 and casing 10. A somewhat greater volume of fluid than this minimum quantity is, of course, preferred so that fluid may flow through the apertures 32 providing the toroidal heat dissipating circulation of fluid previously mentioned. With the casing rotating, centrifugal force will distribute the fluid to a uniform level within the reservoir 23 and the drive chamber 24, the fluid passing freely through the port 40. It will be understood that the rotational speed of the casing 10 as compared to the rotational speed of the shaft 12, that is, the degree of coupling between the two, is dependent upon the amount of fluid in the chamber 24.

Figure 3:
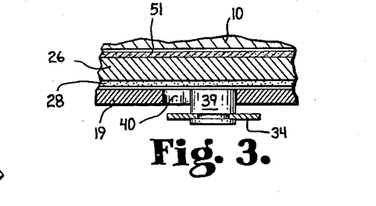
FIG. 3 is an enlarged fragmentary view taken generally along the line 3—3 of FIG. 1.

When the temperature ambient to the bimetal member 63 is relatively high, indicating that a maximum degree of coupling between the casing and the shaft 12 is desirable, the bimetal 63, thrus member 67 and, consequently, the abutment 39 will be in the position shown in FIG. 2 and in enlarged detail in FIG. 3. Under these conditions, the face of the abutment 39 does not extend beyond the rightward (as viewed in FIG. 2) face of the plate 19 and does not extend into the path of fluid in the drive chamber. The pumping means formed by the abutment 39 is thus in an inactive position and centrifugal force maintains the fluid level uniform within the chamber 24 and the reservoir 23, the chamber 24, under these conditions, having maximum fluid therein and therefore the degree of coupling between the shaft 12 and the casing 10 is relatively high.

Figure 4:
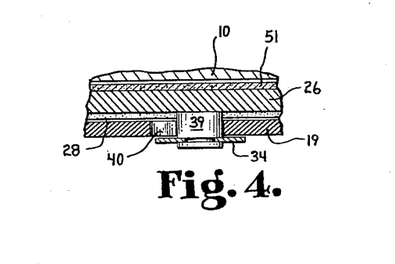
FIG. 4 is a fragmentary view similar to FIG. 3 but showing the position assumed by the structure when actuated by its condition responsive means.
Figure 5:
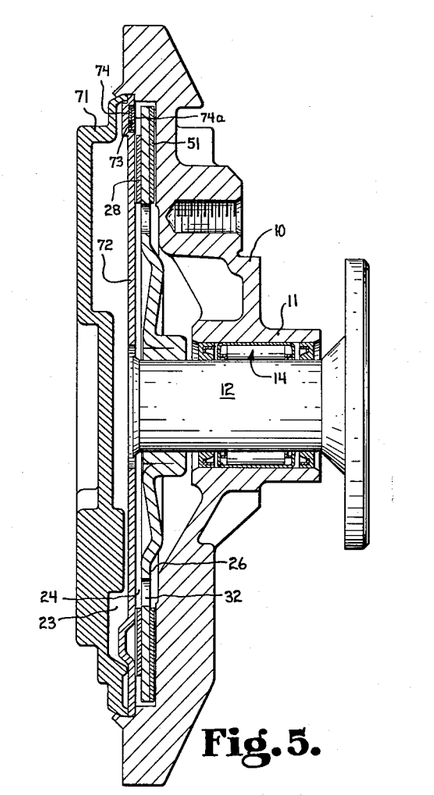
FIG. 5 is a side sectional view similar to FIG. 2 but illustrating a modified form of a coupling embodying the present invention.
Figure 6:
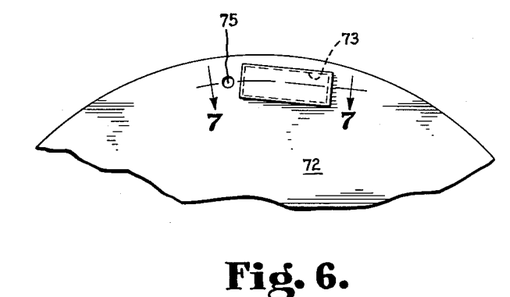
FIG. 6 is a fragmentary front view of the chamber dividing plate shown in FIG. 5.

Should the temperature ambient to the bimetal member 63 decrease, indicating that a decreased degree of coupling between the shaft 12 and the casing 10 is desirable, the central portion of the bimetal strip 63 will move rightwardly (as viewed in FIG. 2), thereby moving the thrust member 67 and consequently the abutment 39 rightwardly. This motion of the abutment 39 positions it so that it extends from the surface of plate 19 into the drive chamber 24 and into the path of fluid therein as shown in detail in FIG. 4. With the abutment member 39 in a position such that it extends into the drive chamber, as shown in FIG. 4, the abutment will act as an impact type pump and will raise the fluid pressure in an area just ahead of, or leading, the abutment. The consequent increase in pressure in this area will drive or pump fluid from the drive chamber 24 through the port 40 and into the reservoir 23. The volume of fluid in the drive chamber 24 will thus be reduced and, as a result, the degree of coupling between the shaft 12 and the casing 10 will also be reduced. Movement of the abutment 39 to its position of FIG. 4 thus places the pumping means in an active position in which it is capable of removing fluid from the drive chamber 24 and transferring it through the port 40 into the reservoir 23.

Referring now to FIGS. 5, 6, 7, and 8, a modified form of the coupling embodying the present invention will now be described. In these figures, environmental parts, which have exact counterparts in FIG. 2 are given the same reference numerals as in FIG. 2. The modified form of the structure shown in FIG. 5 differs from that described with reference to FIG. 2 in that the pumping means is rendered active or inactive by a condition responsive means taking the form of a temperature responsive bimetal strip which responds to the temperature of the fluid within the drive chamber 24 rather than to the temperature external of the casing as is the case of the structure shown in FIG. 2.

The cover member 71 of the modified structure is joined to the casing 10 in the fashion described in detail with reference to FIG. 2. This cover member differs from the cover member 18 of FIG. 2 in that it is not centrally apertured and does not support an external thermal responsive means. The cover member 71 does, however, define with the plate 72 a reservoir chamber 23. The plate 72, in turn, defines in conjunction with the disc 26 a drive chamber 24.

Figures 7, 8, 9, 11:
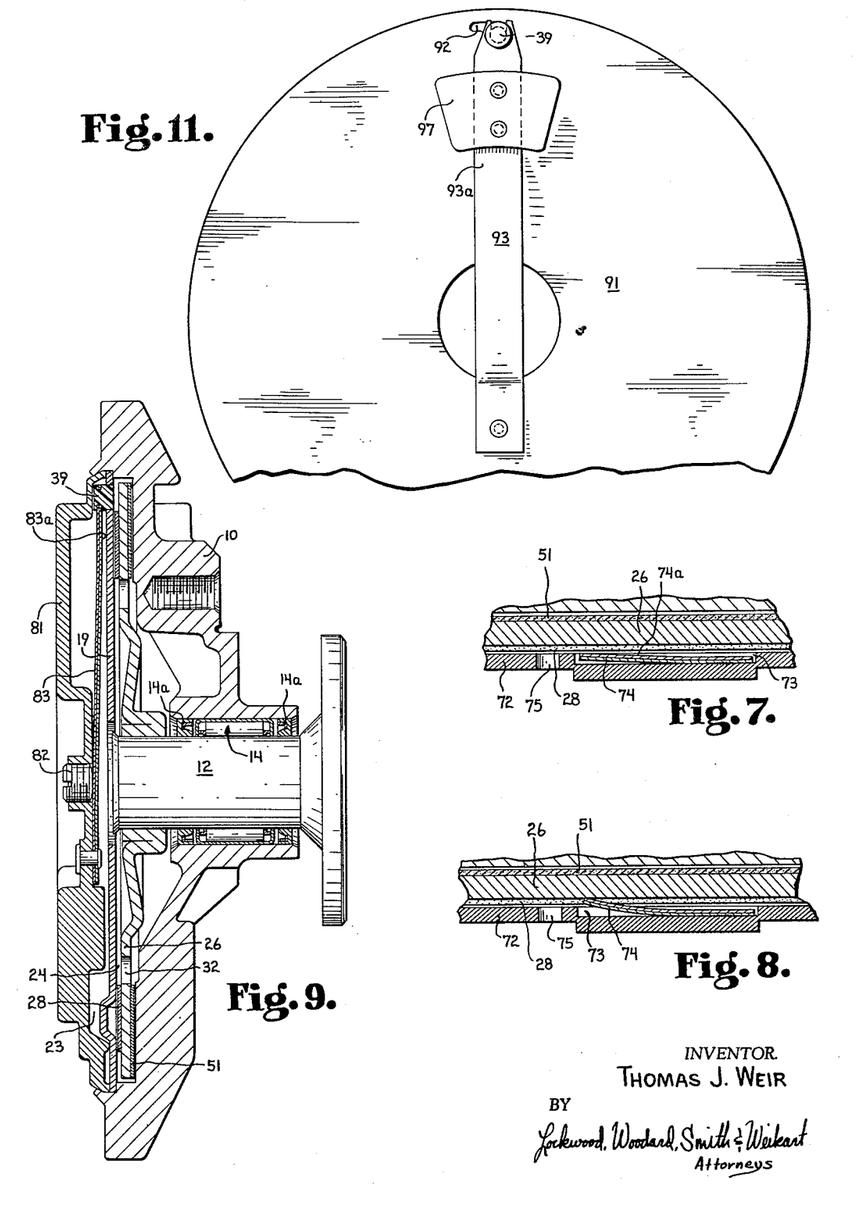
FIG. 7 is a fragmentary sectional view taken generally along the line 7—7 of FIG. 6 and showing the temperature responsive element in inactive position.
FIG. 8 is a fragmentary sectional view similar to FIG. 7 but illustrating the temperature responsive means in its active position.
FIG. 9 is a side sectional view similar to FIG. 2 but illustrating a further modified form of a fluid coupling embodying the present invention.
FIG. 11 is a fragmentary front view (taken from the left hand side of FIG. 10) of the dividing plate shown in FIG. 10 with the actuating assembly in place thereon.

Adjacent its outer margin the disc 72 is indented to provide a generally rectangularly shaped cavity 73 as will be particularly evident from FIG. 7. Within this cavity is mounted, in cantilever fashion, a pumping means taking the form of a bimetal strip 74. The bimetal strip is rigidly mounted to the plate 72 at one of its ends by welding or other suitable means and the bimetal is arranged so that its high expansion side 74a faces the adjacent surface of the disc 26. A port 75 is provided in the plate 72 adjacent to but leading (in the direction of rotation) the free end of bimetal strip 74.

In operation, when the fluid in the drive chamber 24 is at an elevated temperature, indicating the desirability of a high degree of coupling between the shaft 12 and the casing 10, the bimetal 74 will be in the position shown in FIG. 7 wherein its free end does not extend from the surface of the plate 19 into the drive chamber 24. The pumping means formed by the bimetal strip is thus in an inactive position and centrifugal force maintains the fluid level uniform within the chamber 24 and reservoir 23; the chamber 24 thus having a maximum volume of fluid therein.

Should the temperature of the fluid decrease, indicating that a decreased degree of coupling between the shaft 12 and the casing 10 is desirable, the free end of bimetal 74 will move to its position of FIG. 8 wherein it extends into the drive chamber 24. This extension into the drive chamber will provide an impact or scooping pumping action which will raise the pressure of the fluid in an area just ahead of or leading the free end of the bimetal strip. The increase in fluid pressure in this area will serve to direct fluid through the port 75 from the drive chamber 24 into the reservoir 23. With the pumping means thus in its active position the volume of fluid in the drive chamber 24 will be reduced thereby reducing the degree of coupling between the shaft 12 and the casing 10.

Referring now to FIG. 9, a further modified form of the coupling will now be described. In FIG. 9, again, parts having identical counterparts in FIG. 2 are given the same reference numerals as in FIG. 2. The structure of FIG. 9 differs from that of FIG. 2 primarily in the form of the condition responsive means for actuating the pumping means. In FIG. 9 this condition responsive means comprises a bimetal strip which is located inside the casing and the exterior bimetal strip is eliminated. The cover member 81 is provided with a flanged central aperture which is threaded to receive a calibrating screw 82. The rounded, inner end of the adjusting screw 82 engages and forms the fulcrum point for a bimetal strip 83 which is secured by a rivet or other suitable means to the inner face of the cover member 81. The upper, free end of the bimetal strip 83 is notched and fits within the peripheral groove in the abutment 39 which is identical to the similarly identified abutment in FIG. 2. While not visible in FIG. 9, it will be understood that the plate 19 is provided with a port 40 which merges with the aperture accommodating the abutment 39 and which is located just ahead of or leading the abutment as shown in FIG. 1. The bimetal strip 83 is arranged so that its high expansion side 83a is facing the adjacent surface of the plate 19.

In operation, FIG. 9 shows the bimetal 83, and consequently the abutment 39, in the position they assume when the temperature of the interior of the coupling assembly is relatively high. Under these conditions the abutment 39 will not extend into the drive chamber 24 and the pumping means provided by the abutment will therefore be in inactive position. Under these conditions, centrifugal force will cause the fluid in the reservoir 23 and the drive chamber 24 to be at identical levels and the drive chamber 24 will contain a relatively large amount of fluid. The degree of coupling between the shaft 12 and the casing 10 will thus be increased as called for by the elevated temperature condition within the coupling assembly. When the temperature ambient to bimetal 83 decreases, the abutment will be shifted so as to extend into the drive chamber 24. Fluid will then be pumped from the drive chamber lowering the volume of fluid therein and decreasing the degree of coupling between the shaft and the casing.

Figure 10:
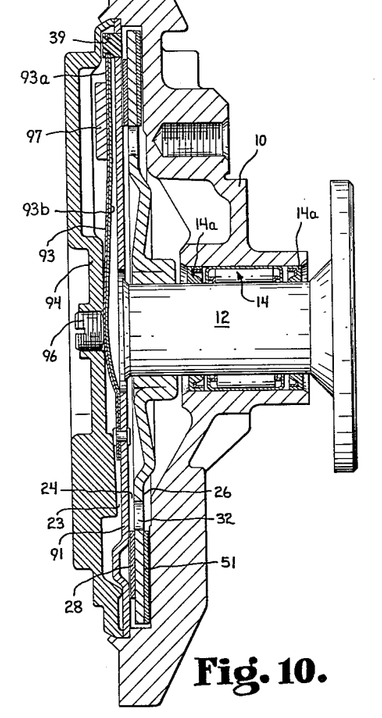
FIG. 10 is a side sectional view of a further modified form of a fluid coupling embodying the present invention.

Referring now to FIGS. 10 and 11, there is disclosed a further modified form of a coupling assembly embodying the present invention. In FIG. 10 parts having exact counterparts in FIG. 2 are given the same reference numerals as in FIG. 2. The structure of FIGS. 10 and 11 differs from that of FIG. 9 primarily in that the condition responsive means for actuating and deactuating the pumping means includes members resspsonsive to both internal coupling temperature and the speed of rotation of the drive member, which in the structure of FIG. 10 is the casing 10. In FIG. 10, the divider plate 91 defines, with the cover member 94 a reservoir chamber 23. The plate 91 further defines with the disc 26 a drive chamber 24.

The pumping means includes the abutment 39, identical to that previously described, which is movable within an aperture in the plate 91, the plate 91 being provided with a port 92 (FIG. 11) which is the counterpart of the port 40 previously described with reference to FIG. 1. The temperature responsive element utilized to actuate the pumping means comprises the bimetal strip 93 which is rigidly attached by any suitable means, such as riveting, to the outer face of the plate 91. At its free end the bimetal strip 93 is notched and is received in the circumferential groove in the abutment member 39.

The cover member 94 is centrally apertured and threaded to receive an adjusting screw 96 whose inner end bears against and establishes the effective fulcrum point for the bimetal strip 93. The bimetal strip 93 differs in configuration from the bimetal strip 83 of FIG. 9 in that an intermediate portion of the strip is bowed away from the plate 91. This end portion 93a of the strip 93 has mounted thereon a weight 97 having appreciable mass. Since the center of mass of weight 97 is, under conditions of reduced temperature within the coupling, displaced leftwardly from its rigid mounting, centrifugal force acting on the weight will tend to stress the bi-metal strip in tension and move the strip rightwardly with increasing force as the speed of rotation of the coupling increases.

Since the bimetal strip 93 is arranged so that its high expansion side 93b faces the adjacent surface of the plate 91, the effect of centrifugal force on the weight 97 tends to counteract or oppose the action of the bimetal strip in moving in response to increasing temperature.

In operation, when the driven member, here taking the form of the casing 10, is rotating at relatively low speed and the temperature of the interior of the coupling assembly is relatively low, the abutment 39 will be positioned rightwardly of its position shown in FIG. 10 and will extend into the drive chamber 24. Under these conditions, the impact type pumping action provided by the abutment 39 will be active and fluid will be pumped from the drive chamber 24, through the port 92 and into the reservoir 23. The volume of fluid in the drive chamber 24 will thus be relatively low and the degree of coupling between the shaft 12 and the casing 10 will be at a reduced value. Should the temperature interior of the coupling assembly increase, the pumping means will be moved to an inactive position by the shifting of the abutment 39 to its leftward position as shown in FIG. 10. Under these conditions, the abutment 39 will not extend into the drive chamber 24 and the pumping action provided by the abutment 39 will cease, permitting fluid to flow from the reservoir 23, through the port 92 and into the drive chamber 24. The increase in volume of fluid in the drive chamber 24 will thereupon increase the degree of coupling between the shaft 12 and the casing 10. Since the effectiveness of the weight 97 on the bimetal strip is a function of coupling speed it will be seen that at low input speeds its effect on the movement of the bimetal will be small. As the input speed is increased and thus the affect of the weight 97 on the bimetal strip increases, it will be evident that, since the weight is tending to move the abutment 39 rightwardly, higher fluid temperatures will be required on the bimetal to obtain identical locations of the abutment than will be required at lower input speeds.

Figure 12:
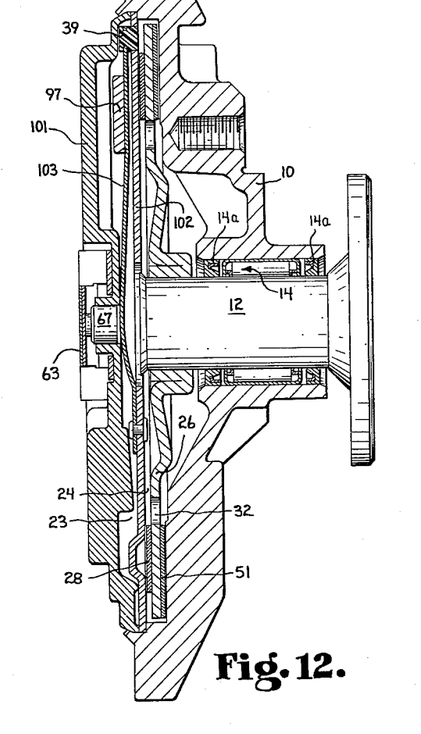
FIG. 12 is a side sectional view of a further modified form of a fluid coupling embodying the present invention.

Referring to FIG. 12, there is disclosed a still further modified form of a coupling assembly embodying the present invention. Here, again, parts which have identical counterparts in FIGS. 1 and 2 are given the same reference numerals as in FIGS. 1 and 2. The structure of FIG. 12 is similar to the structure of FIG. 2, however, the action of the temperature responsive means in actuating the pumping means is modified by an element responsive to the speed of the driven member which in the structure disclosed is the casing 10.

In FIG. 12 the cover member 101 supports the exterior temperature responsive bimetal 63. The dividing plate 102 cooperates with the cover member 101 to provide a reservoir chamber 23 and further cooperates with the disc 26 to provide a drive chamber 24. The plate 102 has rigidly mounted thereon, by means of a rivet or other suitable means, a resilient blade 103. In an intermediate portion the blade 103 is formed so as to bow away from the plate 102 and this bowed portion engages the rounded, inner end of the thrust member 67. The free end of the blade 103 is notched and received within the circumferential groove in the abutment member 39. The portion of the blade 103 adjacent its free end has mounted thereon a weight 97 which is the counterpart of the weight 97 referred to with reference to FIGS. 10 and 11.

In FIG. 12, the position of the abutment member 39 is shown when the temperature ambient to the external thermally responsive bimetal 63 is relatively high. Under these conditions the pumping means will be in inactive position, that is, the abutment member 39 will not extend into the drive chamber 24. With the pumping means inactive, the fluid in the reservoir 23 will flow through the port 40 just ahead, in the direction of rotation, of the abutment 39 until the fluid levels in the reservoir and the drive chamber are the same. Under these conditions, the maximum amount of fluid will be in the drive chamber and the degree of coupling between the shaft 12 and the casing 10 will be relatively high. Should the conditions of temperature decrease, the pumping means will be made active by the shifting of the position of the abutment member 39 rightwardly as viewed in FIG. 12 so that it extends into the drive chamber 24. When this occurs, the impact type pumping action will drive fluid from the drive chamber 24, through the port 40 and into the reservoir 23. The consequent reduction in the volume of fluid in the drive chamber 24 will decrease the degree of coupling between the shaft 12 and the casing 10 in response to the decreasing temperature.

Since the effectiveness of the weight 97 on the blade 103 is a function of coupling speed it will be seen that at low input speeds its effect on the movement of the blade will be small. As the input speed is increased and thus the effect of the weight 97 on the blade increases, it will be evident that, since the weight is tending to move the abutment 39 rightwardly, higher temperatures will be required at the bimetal to obtain identical locations of the abutment.

From the foregoing it will be obvious that each of the various modifications described have in common the feature that the pumping means is actuated or rendered effective only when it is necessary to move fluid from the drive chamber to the reservoir in response to changing operating conditions of the coupling assembly.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends from the surface of said plate into said drive chamber and an inactive position wherein it is withdrawn from said drive chamber, an element movably mounted within said casing and having a portion cooperating with said abutment member for movement thereof, temperature responsive means mounted exteriorly of said outer casing and having means extending within said casing engaging said element to control the position of said abutment member to thereby vary the degree of coupling of said casing and said disc with changes in said temperature.

2. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends from the surface of said plate into said drive chamber and an inactive position wherein it is withdrawn from said drive chamber, temperature responsive means mounted exteriorly of said outer casing and having means cooperating with said abutment member to control the position of said abutment member to thereby vary the degree of coupling of said casing and said disc with changes in said temperature.

3. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said drive means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port, said abutment member being movable between an active position in which it extends from the surface of said plate into said drive chamber and an inactive position wherein it is withdrawn from said drive chamber, temperature responsive means mounted exteriorly of said outer casing and including means cooperating with said abutment member to exert a force thereon effective to shift said abutment member between its said active and inactive positions, said force varying with changes in the temperature ambient to said temperature responsive means to thereby vary the degree of coupling of said casing and said disc with changes in said temperature.

4. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends into the path of the fluid in the drive chamber and an inactive position wherein it is withdrawn from said fluid path, an element movably mounted within said casing and having a portion cooperating with said abutment member for movement thereof, and temperature responsive means including means cooperating with said abutment member to exert a force thereon effective to shift said abutment member between its said active and inactive positions, said force varying with changes in the temperature ambient to said temperature responsive means to thereby vary the degree of coupling of said casing and said disc with changes in said temperature.

5. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising a bimetal strip having a cantilever mounting on the face of said plate adjacent said drive chamber, the free end of said strip being disposed adjacent to said port but trailing said port in the direction of rotation of said plate relative to said drive disc and movable away from said plate into said drive chamber upon a predetermined decrease in the temperature ambient to said bimetal strip to thereupon pump fluid from said drive chamber through said port and into said storage chamber, whereby the degree of coupling between said casing and said disc varies with changes in said temperature.

6. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising a temperature responsive means mounted on said plate adjacent said drive chamber, said temperature responsive means including an abutment member disposed adjacent said port but trailing said port in the direction of rotation of said plate relative to said drive disc and movable away from said plate into the path of the fluid in the drive chamber upon a predetermined change in the temperature ambient to said temperature responsive means to thereupon pump fluid from said drive chamber through said port and into said storage chamber, whereby the degree of coupling between said casing and said disc varies with changes in said temperature.

7. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends from the surface of said plate into said drive chamber and an inactive position wherein it is withdrawn from said drive chamber, a bimetal element mounted within said storage chamber and having a portion cooperating with said abutment member for movement thereof, said bimetal element upon a predetermined decrease in temperature ambient thereto moving said abutment member into its said active position and returning said abutment member to its said inactive position upon a predetermined increase in said temperature, whereby fluid is transferred between said drive chamber and said storage chamber in response to changes in said ambient temperature to thereby vary the degree of coupling between said casing and said disc.

8. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends from the surface of said plate into said drive chamber and an inactive position wherein it is withdrawn from said drive chamber, a temperature responsive element mounted within said casing and having a portion cooperating with said abutment member for movement thereof, said temperature responsive element upon a predetermined change in one sense in the temperature ambient thereto moving said abutment member into its said active position and returning said abutment member to its said inactive position upon a predetermined change in the opposite sense in said temperature, whereby fluid is transferred between said drive chamber and said storage chamber in response to changes in said ambient temperature to thereby vary the degree of coupling between said casing and said disc.

9. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends from the surface of said plate into said drive chamber and an inactive position wherein it is withdrawn from said drive chamber, a cantilever mounted bimetal strip disposed within said storage chamber in overlying relation to said plate and having its free end cooperating with said abutment member for movement thereof, said bimetal strip upon a predetermined decrease in temperature ambient thereto moving said abutment member into its said active position and returning said abutment member to its said inactive position upon a predetermined increase in said temperature, and a weight carried by said bimetal strip and adapted to produce a centrifugal force component upon rotation of said casing urging said bimetal strip to move said abutment member toward its said active position, whereby fluid is transferred between said drive chamber and said storage chamber to vary the degree of coupling between said casing and said disc in response to variation in said ambient temperature and variation in the speed of rotation of said casing.

10. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends into the path of the fluid in the drive chamber and an inactive position wherein it is withdrawn from said fluid path, a temperature responsive element disposed within said casing cooperating with said abutment member for movement thereof, said temperature responsive element upon a predetermined change in one sense in the temperature ambient thereto moving said abutment member into its said active position and returning said abutment member to its said inactive position upon a predetermined change in the opposite sense in said temperature, and a weight associated with temperature responsive element and adapted to produce a centrifugal force component upon rotation of said casing urging said temperature responsive element to move said abutment member toward one of its said positions, whereby fluid is transferred between said drive chamber and said storage chamber to vary the degree of coupling between said casing and said disc in response to variation in said ambient temperature and variation in the speed of rotation of said casing.

11. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends into the path of the fluid in the drive chamber and an inactive position wherein it is withdrawn from said fluid path, a temperature responsive element disposed within said casing cooperating with said abutment member for movement thereof, said temperature responsive element upon a predetermined change in one sense in the temperature ambient thereto moving said abutment member into its said active position and returning said abutment member to its said inactive position upon a predetermined change in the opposite sense in said temperature, and means responsive to casing speed associated with said temperature responsive element and adapted to produce a force component upon rotation of said casing urging said temperature responsive element to move said abutment member toward one of its said positions, whereby fluid is transferred between said drive chamber and said storage chamber to vary the degree of coupling between said casing and said disc in response to variation in said ambient temperature and variation in the speed of rotation of said casing.

12. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends from the surface of said plate into said drive chamber and an inactive position wherein it is withdrawn from said drive chamber, an element movably mounted within said casing and having a portion cooperating with said abutment member for movement thereof, temperature responsive means mounted exteriorly of said outer casing and having means extending within said casing engaging said element to control the position of said abutment member, and a weight carried by said element and adapted to produce a centrifugal force component upon rotation of said casing urging said element to move said abutment member toward its said active position, whereby fluid is transferred between said drive chamber and said storage chamber to vary the degree of coupling between said casing and said disc in response to variation in said ambient temperature and variation in the speed of rotation of said casing.

13. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends into the path of the fluid in the drive chamber and an inactive position wherein it is withdrawn from said fluid path, temperature responsive means mounted exteriorly of said outer casing and including means cooperating with said abutment member to control the position of said abutment member, and a weight associated with said abutment member and adapted to produce a centrifugal force component upon rotation of said casing urging said abutment member toward one of its said positions, whereby fluid is transferred between said drive chamber and said storage chamber to vary the degree of coupling between said casing and said disc in response to variation in said ambient temperature and variation in the speed of rotation of said casing.

14. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends into the path of the fluid in the drive chamber and an inactive position wherein it is withdrawn from said fluid path, temperature responsive means mounted exteriorly of said outer casing and including means cooperating with said abutment member to control the position of said abutment member, and means responsive to casing speed associated with said abutment member and adapted to produce a force component upon rotation of said casing urging said abutment member toward one of its said positions, whereby fluid is transferred between said drive chamber and said storage chamber to vary the degree of coupling between said casing and said disc in response to variation in said ambient temperature and variation in the speed of rotation of said casing.

15. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, a port in said driven means providing fluid communication between said reservoir and said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends into the path of the fluid in the drive chamber and an inactive position wherein it is withdrawn from said fluid path, and condition responsive means disposed within said casing for shifting said abutment member between its said positions whereby fluid is transferred between said drive chamber and said storage chamber in response to changes in said condition to thereby vary the degree of coupling between said casing and said disc.

16. A fluid coupling device comprising a drive shaft, driven means comprising an outer casing and divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, a port in said driven means providing fluid communication between said reservoir and said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends into the path of the fluid in the drive chamber and an inactive position wherein it is withdrawn from said fluid path, and condition responsive means for shifting said abutment member between its said positions, whereby fluid is transferred between said drive chamber and said storage chamber in response to changes in said condition to thereby vary the degree of coupling between said casing and said disc.

17. A torque transmitting device comprising a first element, a second element supported on said first element and rotatable relative thereto, shear surfaces carried by said first and second elements and forming a drive chamber therebetween, a fluid reservoir chamber adjacent said drive chamber, an aperture in said second element providing a port communicating with said drive and reservoir chambers, pump means for transferring fluid from said drive chamber to said reservoir chamber during rotation of said device, said pump means comprising an abutment member supported on said second element adjacent said port but trailing said port in the direction of rotation of said second element with relation to said first element, said abutment member being movable between an active position in which it extends into the path of the fluid in the drive chamber and renders said pump means operable to transfer fluid and an inactive position wherein it is withdrawn from said fluid path and renders said pump means inoperable to transfer fluid, and condition responsive means for moving said abutment member between its said positions.

18. A torque transmitting device comprising a first element, a second element supported on said first element and rotatable relative thereto, shear surfaces carried by said first and second elements and forming a drive chamber therebetween, a fluid reservoir chamber adjacent said drive chamber, port means in said second element providing fluid communication between said drive and reservoir chambers, pump means for transferring fluid from said drive chamber to said reservoir chamber through said port means during rotation of said device, said pump means comprising a movable abutment member cooperating with said port means, said abutment member being movable between an active position in which it extends into the path of the fluid in the drive chamber and renders said pump means operable to transfer fluid and an inactive position wherein it is withdrawn from said fluid path and renders said pump means inoperable to transfer fluid, and condition responsive means for moving said abutment member between its said positions.

References Cited by the Examiner

UNITED STATES PATENTS 2,289,440   7/42   Kugel.
3,055,473   9/62   Oldberg et al.

DAVID J. WILLIAMOWSKY, *Primary Examiner.*